*Moreau Phillips Assignor to himself and Thomas Handy.*
*Loading and Dumping Machine.*

No. 117322 — PATENTED JUL 25 1871

Witnesses:
John W. Smith
Brice I. Sterrett

Inventor,
Moreau Phillips
per Charles P. Housum
his Attorney

UNITED STATES PATENT OFFICE.

MOREAU PHILLIPS, OF SPRINGFIELD, ILLINOIS, ASSIGNOR TO HIMSELF AND THOMAS HANDY, OF SAME PLACE.

IMPROVEMENT IN LOADING AND DUMPING-MACHINES.

Specification forming part of Letters Patent No. 117,322, dated July 25, 1871.

*To all whom it may concern:*

Be it known that I, MOREAU PHILLIPS, of Springfield, in the county of Sangamon and State of Illinois, have invented certain Improvements in Loading and Dumping-Machines, of which the following is a specification:

My invention relates to a machine for loading and dumping earth, the frame or body of the machine being placed upon any farm-wagon. The scraper being lowered to contact with the surface of the ground the disconnected earth is forced into the scraper, and, by means of the trap-doors in the scraper, (to which trap-doors are attached rods and levers,) the earth is thrown in the rear part of the scraper, so that it can be filled full.

Figure 1:
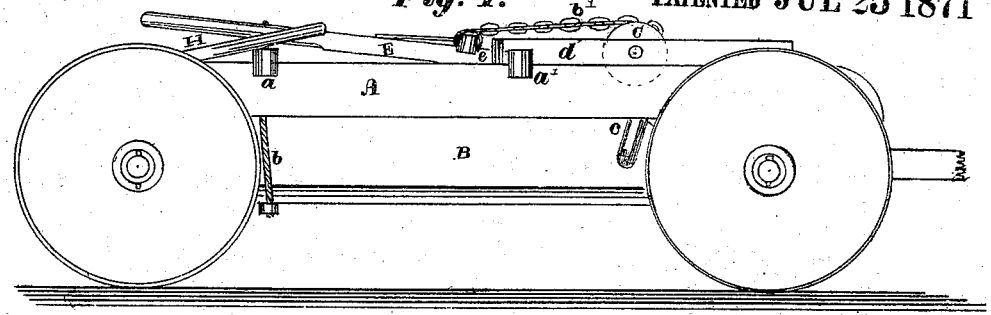
Figure 2:
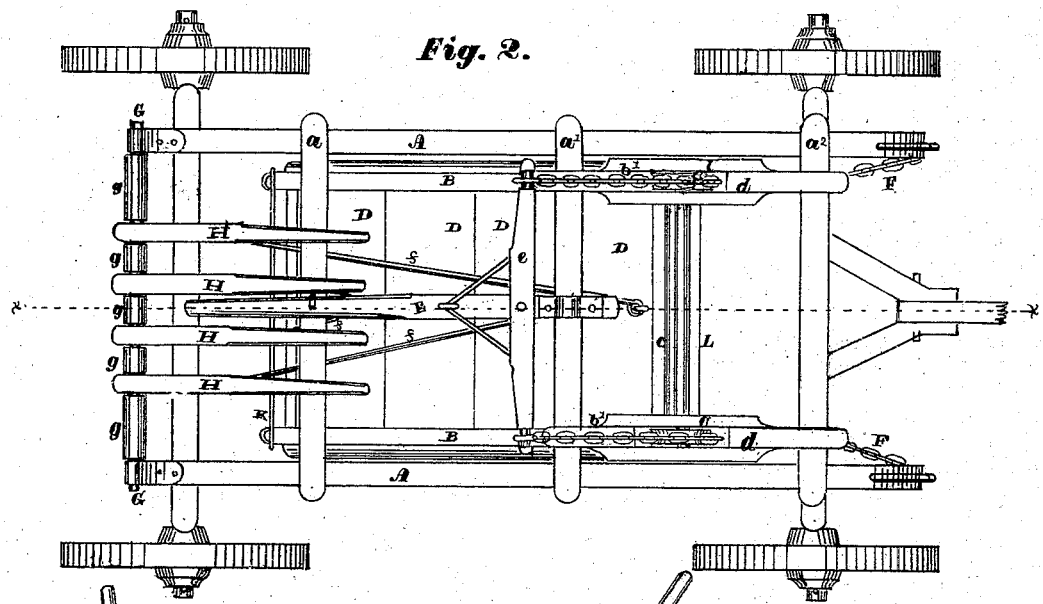
Figure 3:
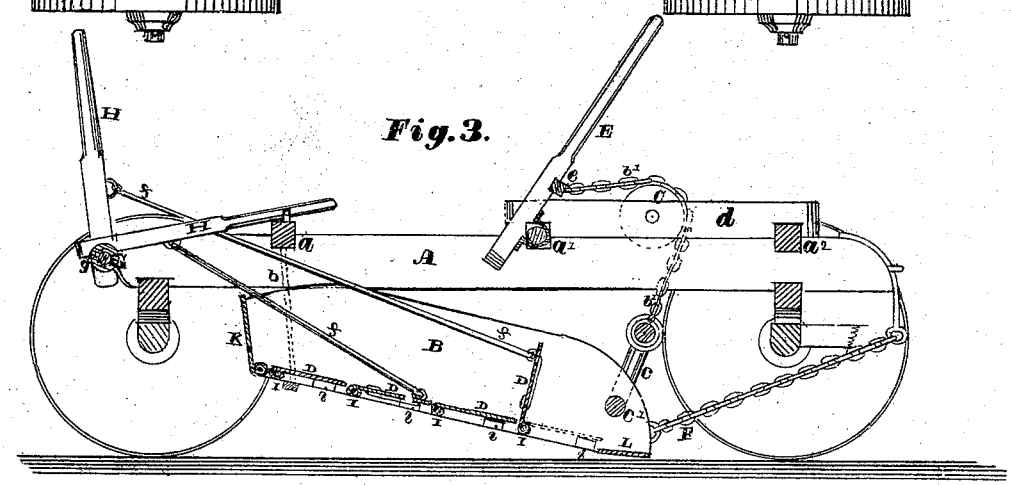

Figure 1 is a side elevation of a machine embodying my invention. Fig. 2 is a plan of the same. Fig. 3 is a sectional view taken through the dotted lines $x\ x$, Fig. 2.

A is the frame or body of the machine, which can be placed upon any farm-wagon. The frame should be substantially constructed. It is braced with the cross-pieces of timber, as shown at $a\ a^1\ a^2$, and the frame is mortised to fit on the bolsters. B is the scraper, the rear part of which is hung to the cross-piece $a$ by ropes or chains $b\ b$, and in front by chains $b'\ b'$, that are fastened to a rod, $c$, that works in bearings in the scraper, as shown at $c'$, said chains passing over pulleys C C, the shafts of the pulleys running in bearings in the pieces of timbers $d\ d$ in the cross-pieces of timber $a^1\ a^2$. The chains are fastened to the cross-bar $e$ of the lever E. This lever serves to raise and lower the scraper, and is held under a catch or hook in the cross-piece $a$. F F are chains attached to the front of the scraper and to the frame A. These chains are stretched tight when the scraper is lowered. D D D D are trap-doors in the scraper. These trap-doors are connected by rods $f\ f\ f\ f$ to the levers H H H. The lever is hinged on a rod, G, on the rear part of the frame. $g\ g$ are washers between the levers. Said levers rest on the cross-piece $a$. The trap-doors are hung on rods I I I I. Passing through the scraper $i\ i\ i\ i$ are lugs to prevent the trap-doors from falling below the scraper. The rear part or tail-gate K is hung on a rod, and is lowered when it is desired to dump the earth from the scraper.

The machine is operated as follows: The scraper is lowered to contact with the ground by means of the lever E. As the machine is drawn forward the earth is scraped in the plate L, and from thence on the first of the trap-doors D D. The earth is then thrown back on the next trap-door by the use of the lever H, raising the trap-door and pitching the earth onto the next trap-door, and so on. By this means the box can be entirely filled; whereas, if the trap-doors were not used the scraper could not be filled or as large a scraper used. When the scraper is filled the front end is raised up by the use of the lever E. To dump the earth from the scraper, let down the tail-gate, raise the rear trap-door by means of the lever H that is connected to it, and then the next trap-door, and so on until the scraper is emptied.

I claim as my invention—

1. The lever E and its catch or hook, pulleys C C, and rod $c$, in combination with the chains $b\ b'$, scraper B, and frame A, substantially as described, and for the purpose hereinbefore set forth.

2. The plate L, trap-doors D D, rods $f\ f$, levers H H, in combination with the frame A and scraper B, substantially as specified.

MOREAU PHILLIPS.

Witnesses:
A. W. WOOD,
WM. PRESCOTT.